United States Patent
Vannithamby et al.

(10) Patent No.: US 10,225,861 B2
(45) Date of Patent: Mar. 5, 2019

(54) METHODS AND APPARATUS FOR CONTENTION BASED SPATIAL SHARING IN WIRELESS COMMUNICATIONS

(71) Applicant: Intel Corporation, Santa Clara, CA (US)

(72) Inventors: Rath Vannithamby, Portland, OR (US); Yi Zhang, Portland, OR (US); Carlos Cordeiro, Portland, OR (US); Ou Yang, Santa Clara, CA (US); Mohammad Mamunur Rashid, Hillsboro, OR (US); Arvind Merwaday, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/476,744

(22) Filed: Mar. 31, 2017

(65) Prior Publication Data
US 2018/0288797 A1   Oct. 4, 2018

(51) Int. Cl.
*H04W 74/08*   (2009.01)
*H04W 72/12*   (2009.01)

(52) U.S. Cl.
CPC ....... *H04W 74/08* (2013.01); *H04W 72/1247* (2013.01)

(58) Field of Classification Search
None
See application file for complete search history.

(56) References Cited

U.S. PATENT DOCUMENTS

| | | | | |
|---|---|---|---|---|
| 9,107,221 B2* | 8/2015 | Cordeiro | ........... | H04W 74/0816 |
| 9,197,482 B1* | 11/2015 | Bharghavan | ........ | H04L 41/5009 |
| 9,532,380 B2* | 12/2016 | Viger | ................ | H04W 74/0816 |
| 2008/0279210 A1* | 11/2008 | Naka | ..................... | H04W 28/18 |
| | | | | 370/448 |
| 2010/0150116 A1* | 6/2010 | Ji | ....................... | H04W 74/0875 |
| | | | | 370/338 |
| 2011/0075642 A1* | 3/2011 | Cordeiro | ........... | H04W 74/0816 |
| | | | | 370/338 |
| 2013/0155955 A1* | 6/2013 | Nabetani | ....................... | 370/328 |
| 2016/0073288 A1* | 3/2016 | Patil | ..................... | H04W 74/08 |
| | | | | 370/230 |
| 2016/0105900 A1* | 4/2016 | Zhang | ............... | H04W 74/0816 |
| | | | | 370/338 |

OTHER PUBLICATIONS

Sanderovich et al., "Spatial Reuse by Interference Alignment for 802.11ay," May 13, 2016, 22 pages.

* cited by examiner

*Primary Examiner* — Hong S Cho
(74) *Attorney, Agent, or Firm* — Hanley, Flight & Zimmerman (57) ABSTRACT

Methods and apparatus for contention based spatial sharing in wireless communications. An example first wireless communications device includes: a memory to store data for transmission; a priority controller to: determine an estimated transmission time; set a contention window setting based on the estimated transmission time; a media access control to: wait for a timer to expire, a duration of the timer selected based on the contention window setting; and transmit the data when the timer expires.

23 Claims, 6 Drawing Sheets

METHODS AND APPARATUS FOR CONTENTION BASED SPATIAL SHARING IN WIRELESS COMMUNICATIONS

FIELD OF THE DISCLOSURE

This disclosure relates generally to wireless communications, and, more particularly, to methods and apparatus for contention based spatial sharing in wireless communications.

BACKGROUND

In a wireless network containing a network controller (e.g., an access point (AP)) and multiple mobile devices (e.g., STAs), sometimes a pair of STAs will establish a direct communications link with each other (i.e., communication between those two STAs does not have to be routed through the AP). If these two STAs have the capability for directional communication, that link may also be a directional link. However, even though their link is directional, their communication with each other may still cause interference with other devices, either due to the position of those other devices or because of the side lobes of the directional transmissions. Steps may need to be taken to see if such communication interferes with communication by other directional pairs, to determine if spatial reuse can take place (i.e., each pair communicates over their respective directional links at the same time). Traditionally, such spatial reuse takes place during Service Periods (SP), in which STA communication is scheduled by the AP and therefore the AP can avoid potential interference situations. But there is an increasing need for such spatial reuse to take place during Contention Based Access Periods (CBAPs), which are periods for unscheduled first-come first-serve access to the medium.

BRIEF DESCRIPTION OF THE DRAWINGS

Wherever possible, the same reference numbers will be used throughout the drawing(s) and accompanying written description to refer to the same or like parts.

DETAILED DESCRIPTION

Currently known techniques for STA-pair spatial reuse during a CBAP incur additional overhead that contributes to reduced bandwidth during the affected transmission periods. Since the AP is not scheduling these communications, and the STAs are trying to randomly access the medium, this leaves spatial reuse and its overhead burden essentially unmanaged, to the detriment of the network.

Some existing solutions CBAP use a randomly assigned for STA pairs. However, the length of the spatial sharing time is set by the first pair to establish a connection. Accordingly, if the pair that is randomly assigned the shortest back off happens to have small amount of data for transmission, all other pairs will be limited to the shorter transmission time to ensure that the end of the transmission times is aligned.

CBAP utilizes distributed scheduling that prevents the system from forcing a particular STA pair (e.g., the STA pair with the longest transmission time) from being forced to be the first STA pair to transmit. Accordingly, methods and apparatus disclosed herein facilitate prioritization of the STA pairs that will utilize longer transmission times to be the first to transmit. In addition, methods and apparatus disclosed herein facilitate prioritization of all STA pairs based on their transmission times to attempt to optimize the transmission order in decreasing transmission times. To add prioritization, methods and apparatus disclosed herein select a contention window (CW) (e.g., an amount of time to wait before determining if a transmission collision is present) based on an estimate of the transmission time (e.g., amount of buffered data divided by transmission bandwidth) for a STA pair. By selecting a shorter contention window for STA pairs that have a longer estimated transmission time, the longer transmission time STA pairs are more likely to transmit earlier and more likely to extend the transmission time for all STA pairs. In some examples, the CW is selected based on a calculation including the estimated transmission time. In some examples, the CW is selected by setting a quality of service (QoS) class of service based on the estimated transmission time.

The term "wireless" may be used to reference the communication of data by using modulated electromagnetic radiation propagated through a non-solid medium. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and the data that has been received. The processor(s) may also process other data which is neither transmitted nor received. The memory may contain instructions and/or data.

As used within this document, a network controller may schedule and control, at least partially, wireless communications by other devices in the network. A network controller may be described by the terms "access point" (AP), PBSS Control Point (PCP), PCP/AP, base station (BS), or any other term that may arise to describe the functionality of an AP.

As used within this document, the term "station" (STA) is intended to cover those devices whose wireless communications are at least partially scheduled and controlled by the network controller. A STA may also be known as a mobile device (MD), mobile station (MS), subscriber station (SS), user equipment (UE), or any other term that may arise to describe the functionality of a STA. STAs may typically be capable of moving while communicating, but such movement is not required.

As used within this document, the term "communicate" is intended to include transmitting and/or receiving. Similarly, the term "communicate" may refer to the bidirectional exchange of data between two devices (both devices transmit and receive during the exchange).

Directional transmission—transmitting wireless signals in a manner that focuses most of the transmission energy in one direction, so that it is most likely to be received by other devices that are in that direction, and less likely to be received by devices in other directions.

Directional reception—receiving wireless signals in a manner such that incoming signals are received most clearly from a particular direction.

Spatial Reuse—directionally communicating in different directions (spatial channels) over the same frequency channel(s) at the same time, transmission power control, etc. For directional communications techniques, the directionality of the communications may be used to allow multiple communication links between different devices to operate simultaneously over the same frequencies, even though the different links might interfere with each other if the communications were omni-directional. Different content may be simultaneously communicated over the different spatial channels.

Spatial reuse pair—two wireless devices that communicate directionally with each other over a spatial channel. Other spatial reuse pairs may operate simultaneously in the same vicinity over the same frequency channels but different spatial channels.

Training sequence—a series of communications between two devices that permits them to tune their antenna arrays in a manner that establishes a spatial channel between them. Training sequence can also refer to tuning the antenna array in a manner that avoids interference with or by other devices that are in specific directions.

Spatial Reuse Training—a type of training sequence that tests whether communication over a previously-established directional link between two devices causes interference with simultaneous communication over another previously-established directional link between two other devices.

Service period (SP)—a period of time designated for scheduled communications within a network. Scheduled communication may occur within the SP when an AP assigns specific times for specific STAs to communicate.

Contention based access period (CBAP)—a period of time designated for contention-based communications within a network. With CBAP, each STA that wants to transmit must contend with the other STAs to obtain control of the wireless medium. This is typically done on a first-come first-serve basis, with various techniques used to resolve a tie when two devices attempt to access the medium at the same time.

Figure 1:
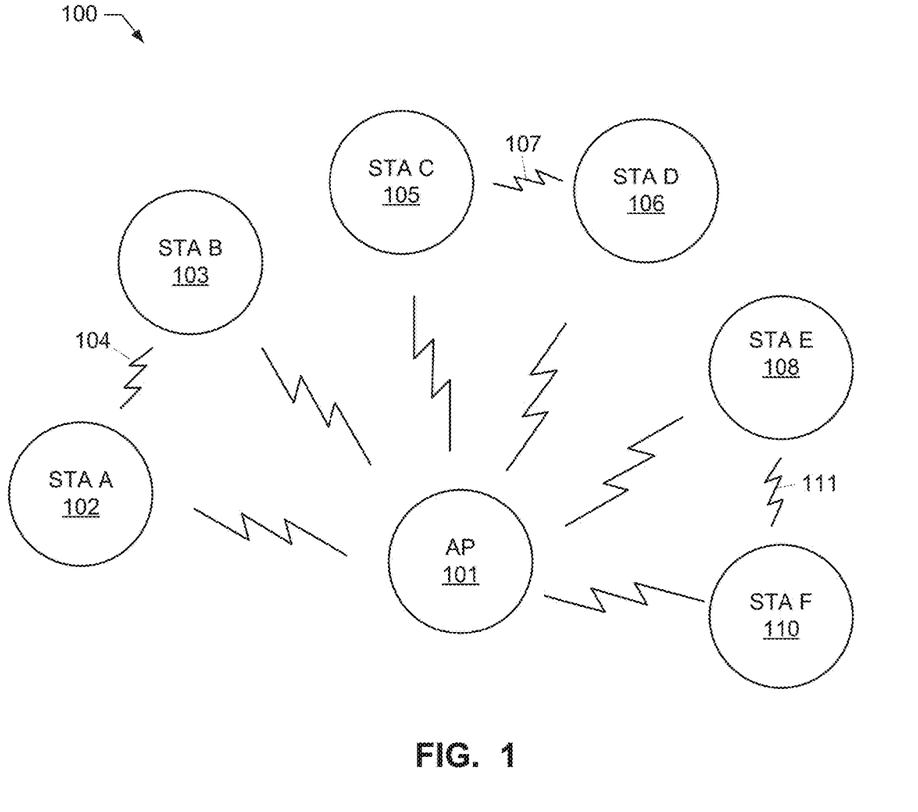
FIG. 1 is a block diagram of an example communication network.

FIG. 1 is a block diagram of an example communication network 100. Network 100 includes PCP/AP 101, STAs 102 (STA A), 103 (STA B), 105 (STA C), 106 (STA D), 108 (STA E), 110 (STA F). Other STAs may also be in network 100, but are not shown for simplicity of description. As seen from FIG. 1, each of STAs A, B, C, D, E, and F may communicate wirelessly with PCP/AP 101. Whether these PCP/AP-to-STA links are directional or non-directional is not considered relevant to this disclosure. However, communications link 104 may be a directional link between devices 102 and 103, while communications link 107 may be a directional link between devices 105 and 106, and communication link 111 may be a directional link between devices 108 and 110. The method of establishing directional links 104, 107, and 111 may be improved by the methods and apparatus disclosed herein.

Figure 2A:
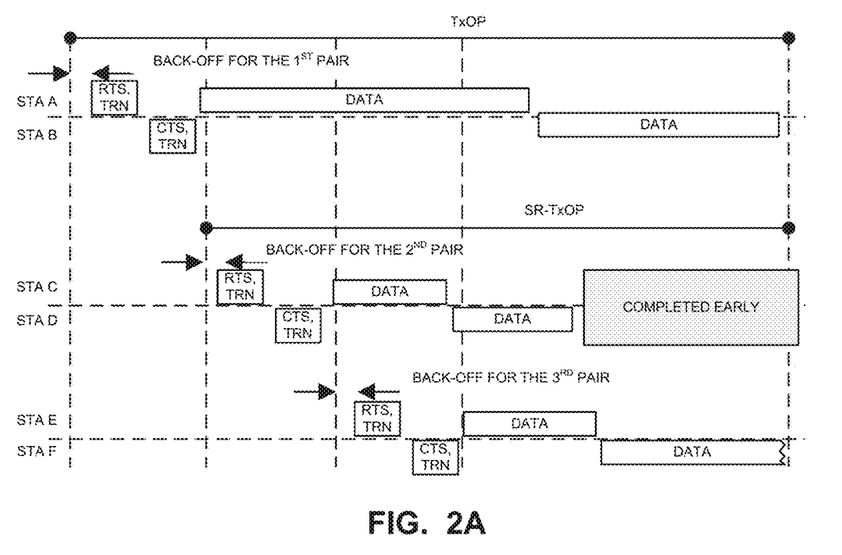
FIGS. 2A and 2B are message diagrams illustrating example CBAP handling by example STAs.

FIG. 2A is a message diagram illustrating example CBAP handling by the example STAs 102, 103, 105, 106, 108 and 110 under existing processes. According to the illustrated example, the pair of STA A 102 and STA B 103 waits its back-off period according to the contention window selected (e.g., a back-off selected uniformly between 0 and the contention window setting). In this example, the example pair of STA A 102 and STA B 103 completed its back-off wait first and was the first to start communication by sending a ready to send (RTS) with training (TRN), a clear to send (CTS) with TRN, data from STA A 102 to STA B 103, and data from STA B 103 to STA A 102. The time period from the start of the back-off wait to the completion of the data transmission is referred to as the transmit opportunity (TxOP). The other STAs monitor the messages including the TRN information to learn how to beamform communications without interfering with the STA A 102/STA B 103 pair. The time period from the completion of the CTS/TRN to the end of the TxOP is referred to as the spatial reuse transmit opportunity (SR-TxOP). In the illustrated example, the next pair of STAs to complete the back-off delay is the pair of STA C 105 and STA D 106. As shown in the illustrated example, the pair of STA C 105 and STA D 106 completes its data transfer earlier than the end of the TxOP/SR-TxOP. However, once the transmission has begun other devices (e.g., the pair of STA E 108 and STA F 110) cannot utilize space vacated by the early completion because such an operation could affect later transmitting pairs. Accordingly, the space is wasted. Furthermore, the transmit time allocated to the pair of STA E 108 and STA F 110 is shorter than the SR-TxOP due to the time consumed by the second pair transmitting the RTS/TRN and CTS/TRN. Accordingly, even if the third pair had more data than the second pair (as illustrated by the broken edge of the data transmission of STA F which had to cut short at the end of the transmission opportunity), the third pair could be limited due to the need to end at the end of the TxOP. Furthermore, placing the STA E/F pair third results in that pair (that has more data and/or a longer transmission time than the STA C/D pair) to be in a more difficult position of beamforming around both the STA AB and STA C/D pairs. Accordingly, it would be more efficient if the pair with the most data transmits first, followed by the pair with the next most data, etc. If the devices transmit at different bandwidth rates, the transmission time should be considered as a device with less data but low bandwidth may still transmit longer than a device with a more data and high bandwidth.

Figure 2B:
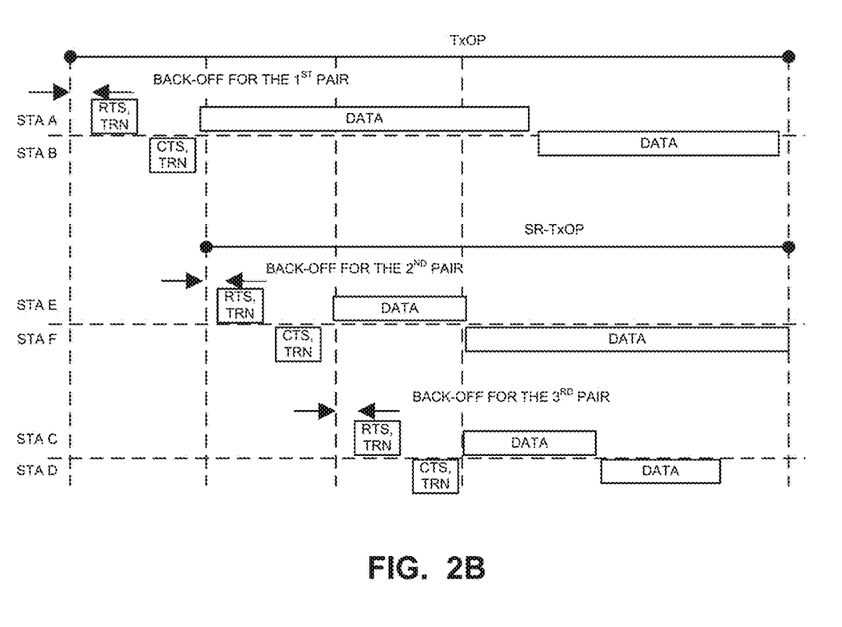

FIG. 2B illustrates an improved handling of CBAP according to the methods and apparatus disclosed herein. As illustrated in the example of FIG. 2B, the pair of STA E and STA F has been prioritized to transmit before the pair of STA C and STA D because STA E/F has a longer transmission time than STA C/D. Accordingly, more of the data from STA E/F is able to be transmitted before the end of the transmission opportunity, less air time is wasted on a non-transmitting pair (e.g., at the end of the transmission time of STA C/D), and a pair with a longer transmission time is ordered earlier than a pair with a shorter transmission time leading to the pair with the longer transmission time having to contend with beamforming around fewer prior transmission pairs (e.g., in FIG. 2B, the STA E/F pair only needs to beamform around the STA AB pair not the STA C/D pair). By prioritizing the ordering of the STA pairs based on transmission time, the above efficiencies in transmission may be achieved. Two example approaches illustrating the principles disclosed herein for prioritizing based on transmission time are discussed in conjunction with FIGS. 4 and 5.

Figure 3:
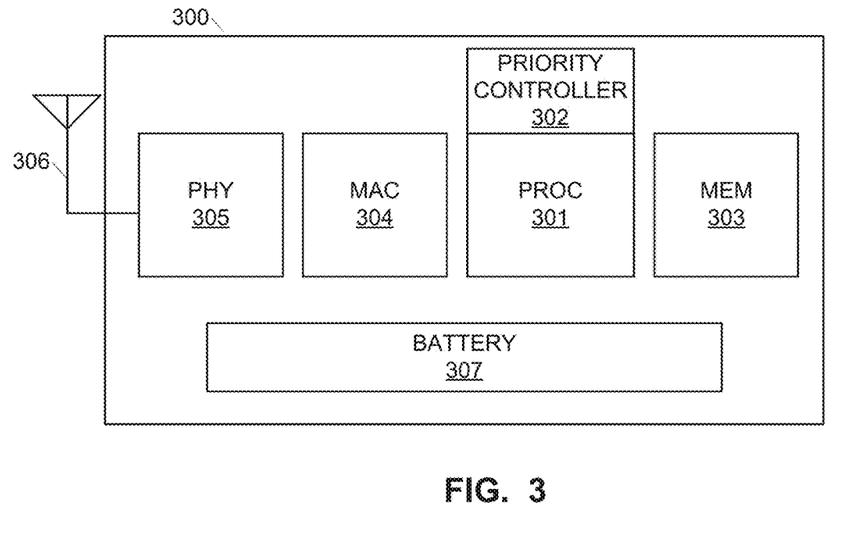
FIG. 3 is a block diagram of an example wireless communication device.

FIG. 3 is a block diagram of an example wireless communication device 300. Device 300 may include at least one processor 301, a priority controller 302, at least one memory 303, a medium access (MAC) module 304, a physical (PHY) module 305, an antenna array 306, and a battery 307. Using an 'array' of antennas may permit the communications to be directional by adjusting the phase and/or amplitude of the signal to/from various antennas in the array. The device 300 may also contain a baseband processor, which may reside in the example MAC 304, the example PHY 305, or both. Among other uses, the at least one memory 303 may contain instructions which when executed cause performance of operations described in this document.

The priority controller 302 of the illustrated example controls the operation of the example device 300 during CBAP to attempt to optimize the ordering in which STA pairs transmit and, thus, share air space. The example priority controller 302 controls the selection of a contention window for an STA pair based on an estimated transmission time to transmit data stored in buffers of the STAs (e.g., the devices 300). In some examples, the priority controller 302 may be implemented within the MAC 304. In other examples, the priority controller 302 may be implemented within the processor 301. Alternatively, the priority controller 302 may be implemented as a standalone component or any other component that is in communication with the MAC 304 and/or the processor 301.

Figure 4:
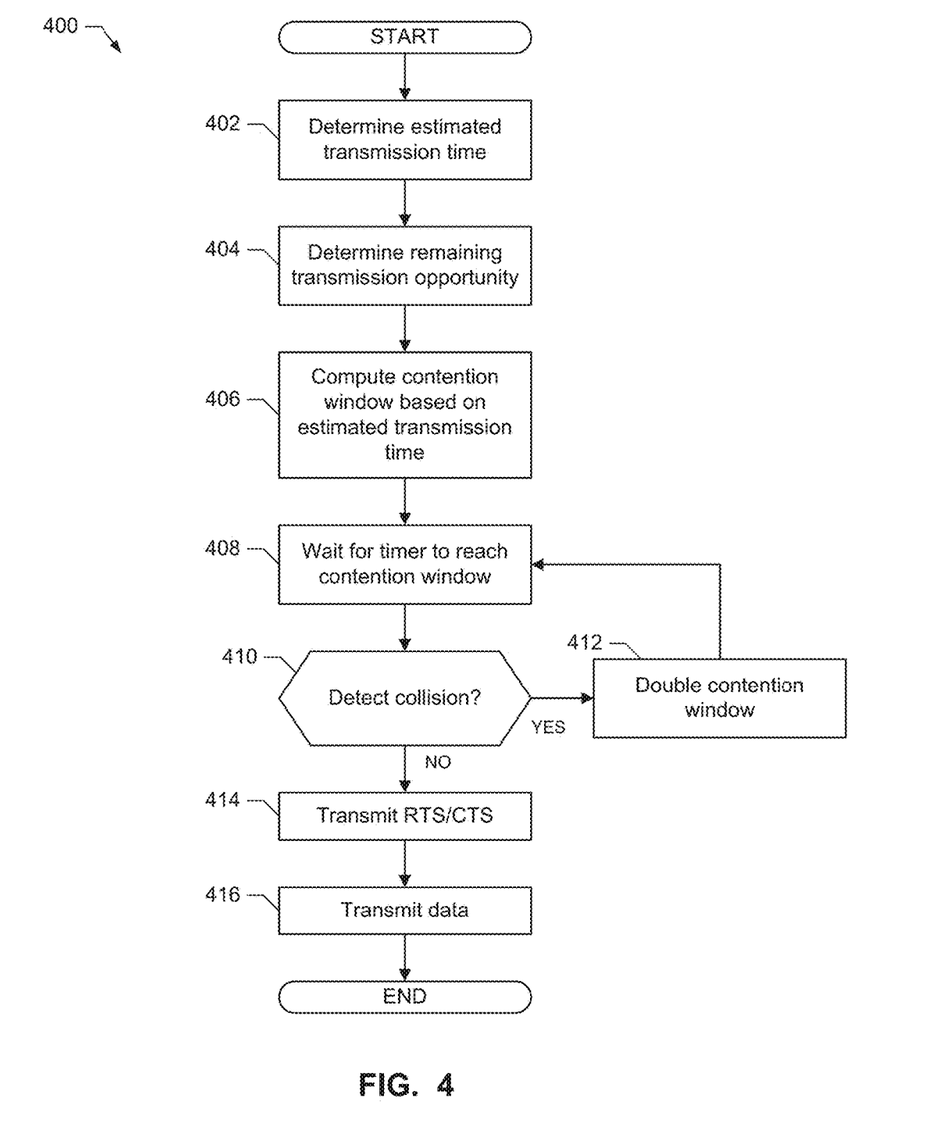
FIGS. 4-5 are flowcharts illustrating example machine readable instructions that may be executed to implement the device of FIG. 3.

As described in conjunction with FIG. 4, the priority controller 302 may calculate a value to be used for the contention window based on the estimated transmission time. According to the illustrated example, the longer the transmission time the shorter the contention window calculated to increase the likelihood that the pair with the shortest contention window transmits first, thereby, setting the duration of the TxOP.

Figure 5:
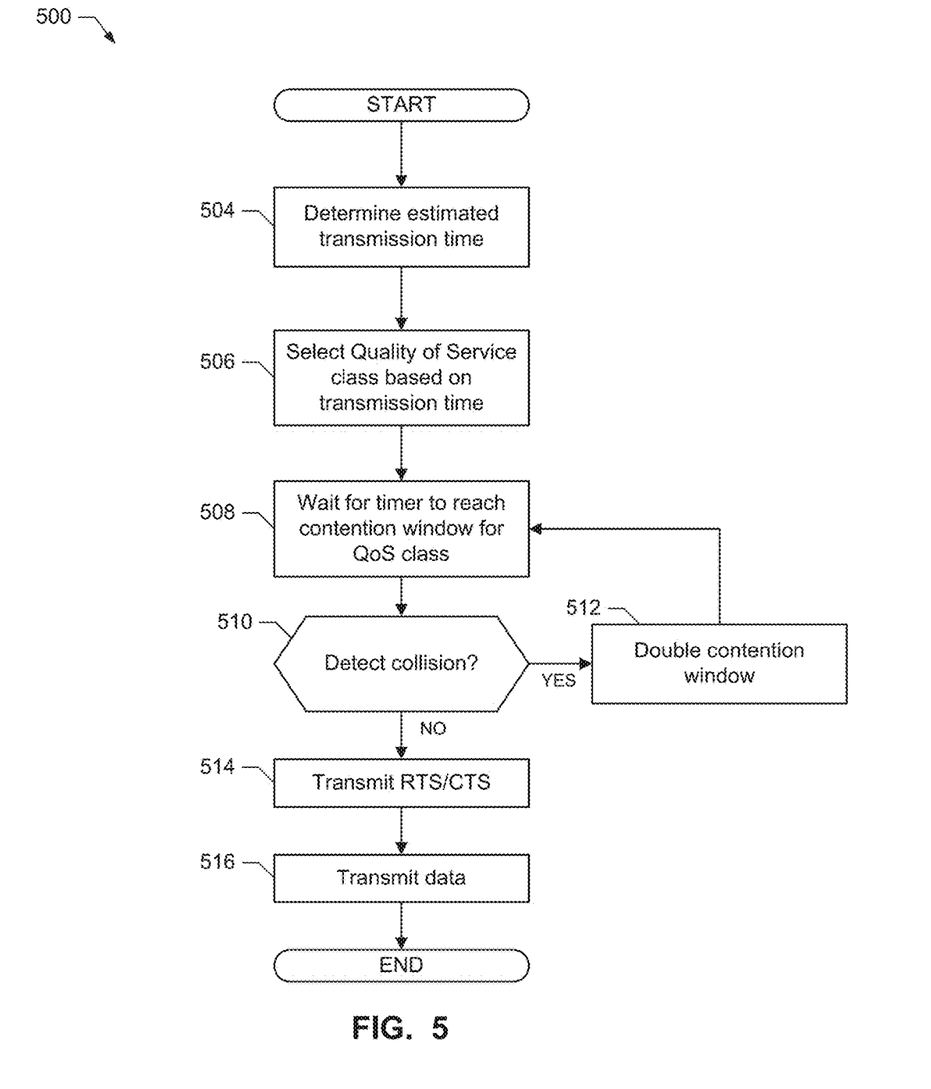

As described in conjunction with FIG. 5, the priority controller 302 may assign a QoS class that has an associated maximum and minimum contention window and inter frame space (IFS) (e.g., in order of decreasing contention window—best effort, background, voice, and video). In other words, higher priorities are assigned to pairs that have longer transmission times.

According to the illustrated example, each of the STAs of FIG. 1 may be implemented by the example device 300 or another device.

While an example manner of implementing the device 300 is illustrated in FIG. 3, one or more of the elements, processes and/or devices illustrated in FIG. 3 may be combined, divided, re-arranged, omitted, eliminated and/or implemented in any other way. Further, the example processor 301, the example priority controller 302, the example memory 303, the example MAC module 304, the example PHY module 305, and/or, more generally, the example device 300 of FIG. 3 may be implemented by hardware, software, firmware and/or any combination of hardware, software and/or firmware. Thus, for example, any of the example processor 301, the example priority controller 302, the example memory 303, the example MAC module 304, the example PHY module 305, and/or, more generally, the example device 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, processor 301, the example priority controller 302, the example memory 303, the example MAC module 304, and/or the example PHY module 305 is/are hereby expressly defined to include a tangible computer readable storage device or storage disk such as a memory, a digital versatile disk (DVD), a compact disk (CD), a Blu-ray disk, etc. storing the software and/or firmware. Further still, the example device 300 may include one or more elements, processes and/or devices in addition to, or instead of, those illustrated in FIG. 3, and/or may include more than one of any or all of the illustrated elements, processes and devices.

Flowcharts representative of example machine readable instructions for implementing the device 300 of FIG. 3 are shown in FIGS. 4-5. In the examples, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4-5, many other methods of implementing the example device 300 may alternatively be used. For example, the order of execution of the blocks may be changed, and/or some of the blocks described may be changed, eliminated, or combined.

As mentioned above, the example processes of FIGS. 4-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 400 of FIG. 4 begins at block 402 when the example priority controller 302 then determines an estimated transmission time to transmit data stored in a buffer (e.g., in the memory 303 of the device 300). For example, the transmission time may be determined by dividing an amount of data by a bandwidth. The bandwidth may be a theoretical bandwidth of the connection and/or may be an observed bandwidth.

The example priority controller 302 then determines a remaining transmission opportunity time (block 404). For example, when the priority controller 302 determines that it is operating for the first STA pair to transmit (e.g., the priority controller 302 has not received information from an RTS, CTS, TRN, etc. from other stations), the remaining transmission opportunity is the entire transmission opportunity for the transmission time of the STA pair. However, as each pair of STAs transmits, the remaining transmission opportunity decreases. The example priority controller 302 may determine the remaining transmission opportunity based on the information in a TRN received from the previous STA pair to transmit and/or from the TRN sent by all STA pairs to transmit before the current STA pair. The remaining transmission opportunity is a maximum amount of time left for the current STA pair to transmit before the end of the transmission opportunity established when the first STA pair transmits. Accordingly, even if the transmission time for the station is longer than the remaining transmission opportunity, the example priority controller 302 may consider the actual transmission time to be the remaining transmission opportunity time.

The example priority controller 302 then computes the contention window to be used for transmissions (block 406). The example priority controller 302 computers the contention window such that a shorter estimated transmission time results in a longer contention window and a longer estimated transmission time results in a shorter contention window. For example, the contention window may be computer as: $CW'_{max}=(CW_{min}+[(1-\min(\text{TransmissionTime},T_{CBAP})/T_{CBAP})*(CW_{max}-CW_{min})])$, where $CW'_{max}$ is the calculated contention window to be used by the device 300, TransmissionTime is the estimated transmission time, $T_{CBAP}$ is the time duration that can be used for spatial reuse (for the first STA pair, $T_{CBAP}$ is the totally available time for spatial reuse, for the second pair $T_{CBAP}$ is the minimal SR-TxOP available, etc.), and $CW_{max}$ is the maximum contention window assigned to the device, and $CW_{min}$ is the minimum contention window assigned to the device.

The example MAC module 304 then waits for a timer based on the contention window (block 408). For example, the MAC module 304 may set a back-off timer to be a value between the $CW_{min}$ and the $CW'_{max}$ (e.g., randomly selected, uniformly selected, etc.). Once the timer expires, the example MAC module 304 determines if a collision exists (e.g., another device is already transmitting) (block 410). When a collision exists (e.g., another STA pair is broadcasting an RTS, CTS, TRN, etc.), the example MAC module 304 doubles the calculated contention window (e.g., up the maximum contention window associated with the device 300 (block 412) and control returns to block 408 to continue transmission attempts. Alternatively, control could return to block 402 to re-start the process of computing the contention window using information learned following the last computation (e.g., based on a new remaining transmission opportunity following another STA pair conducting a transmission).

If a collision is not detected by the MAC module 304 (block 410), then the PHY module 305 transmits a RTS (e.g., with a TRN) and/or a CTS (e.g., with a TRN) (block 414). According to the illustrated example, the RTS, CTS, and/or TRN are transmitted to all STA (e.g., broadcast, transmitted with a broadband signal, etc.) to provide the information contained in the messages (e.g., training data, beamforming data, transmission opportunity information, etc.) to all STA. For example, the RTS, CTS, and/or TRN data may be transmitted using beamforming that is broadband but does not interfere with the STA that are already transmitting (e.g., to avoid the space utilized by those already transmitting data transmissions). The example MAC module 304 then transmits the data (e.g., stored in a buffer in the example memory 303) (block 416). The process of FIG. 4 then terminates until the next transmission period.

The program 500 of FIG. 5 begins at block 504 when the example priority controller 302 determines an estimated transmission time to transmit data stored in a buffer (e.g., in the memory 303 of the device 300) (block 504). For example, the transmission time may be determined by dividing an amount of data by a bandwidth. The bandwidth may be a theoretical bandwidth of the connection and/or may be an observed bandwidth.

The example priority controller 302 then determines a QoS class that will control the contention window based on the estimated transmission time (block 506). For example, the QoS class may be selected based on a set of thresholds (e.g., buffer size thresholds, transmission time thresholds, etc.) associated with various classes. According to the illustrated example, the larger the buffer and/or transmission time, the higher the priority QoS class that is selected (e.g., the "video" class is selected for the longest threshold and the "best effort" class is selected for the shortest threshold). Each of the QoS classes correspond to set contention windows (e.g., the higher the priority QoS class, the shorter the associated content window).

The example MAC module 304 then waits for a timer based on the contention window (block 508). For example, the MAC module 304 may set a back-off timer to be a value between the $CW_{min}$ and the $CW'_{max}$ associated with the selected QoS class (e.g., the back-off time may be randomly selected, uniformly selected, etc.). Once the timer expires, the example MAC module 304 determines if a collision exists (e.g., another device is already transmitting) (block 510). When a collision exists, the example MAC module 304 doubles the calculated contention window (e.g., up the maximum contention window associated with the device 300 (block 512) and control returns to block 508 to continue transmission attempts.

If a collision is not detected by the MAC module 304 (block 510), then the PHY module 305 transmits a RTS (e.g., with a TRN) and/or a CTS (e.g., with a TRN) (block 514). The example MAC module 304 then transmits the data (e.g., stored in a buffer in the example memory 303) (block 516). The process of FIG. 5 then terminates until the next transmission period.

Figure 6:
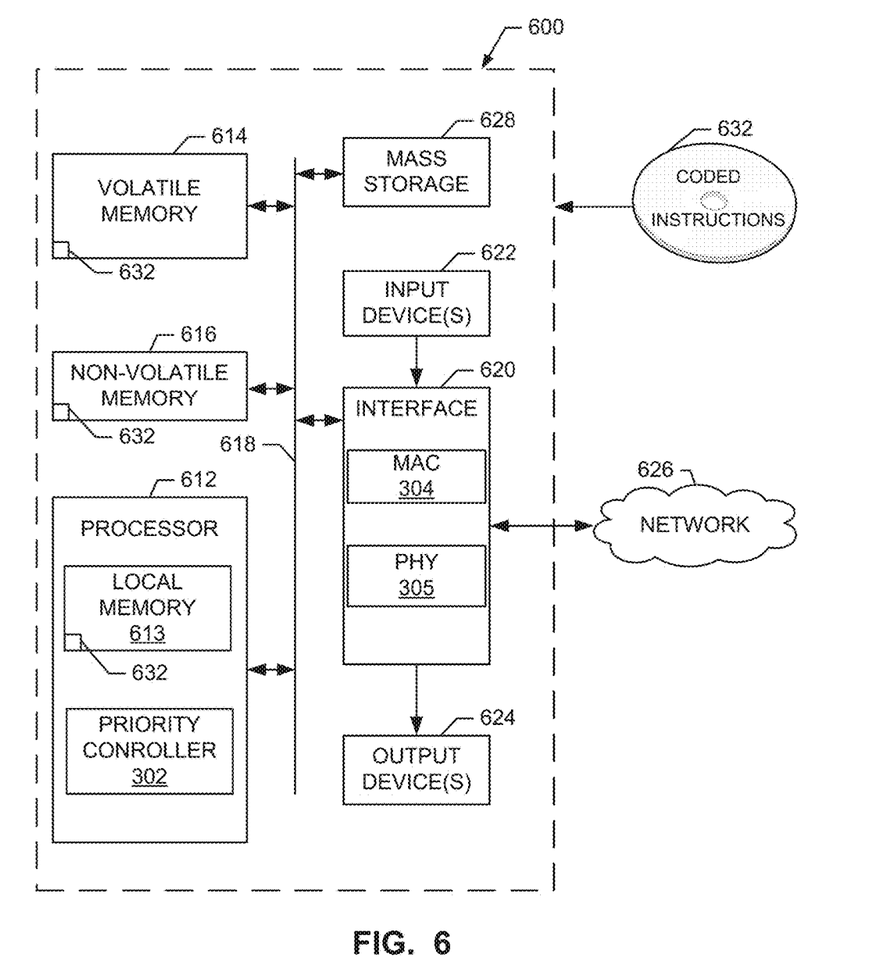
FIG. 6 is a block diagram of a processor system that may execute the instructions of FIG. 4 and/or FIG. 5 to implement the example device of FIG. 3.

FIG. 6 is a block diagram of an example processor platform 600 capable of executing the instructions of FIGS. 4-5 to implement the device 300 of FIG. 3. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device utilizing a wireless connection.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The example processor 612 includes the example priority controller 302.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller. The processor 612 may implement the processor 301 and the example volatile memory 614 may implement the example memory 303.

The processor platform 600 of the illustrated example also includes an interface circuit 620. The interface circuit 620 may be implemented by any type of interface standard, such as an Ethernet interface, a universal serial bus (USB), and/or a PCI express interface. The example interface circuit includes the example MAC module 304 and the example PHY module 305.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 4-5 may be stored in the mass storage device 628, in the volatile memory 614, in the non-volatile memory 616, and/or on a removable tangible computer readable storage medium such as a CD or DVD.

From the foregoing, it will appreciate that the above disclosed methods, apparatus and articles of manufacture may results in more efficient sharing of wireless air space in CBAP. For example, by controlling the selection of a maximum contention window setting, the order in which station pairs transmit in a contentious communication space can be influenced to make it more likely that STA pairs transmit in order of decreasing transmission time and/or transmission data size. In addition, by controlling the selection of a maximum contention window setting, a STA pair with a longest transmission time and/or largest transmission data size will be more likely to be selected as the first pair to transmit during a transmission opportunity. As the first pair to transmit controls the length of the TxOP, influencing the pair with the longest transmission time and/or largest transmission data size to transmit first will increase the TxOP that may be utilized by other devices providing an increase in the amount of data that may be transmitted during a TxOP.

Although examples disclosed herein refer to configuring a contention window based on transmission times, data sizes, buffer sizes, etc., any of the examples may utilize any data exchange parameters. As used herein, a data exchange parameter is a value representative of the amount of data to be transferred by one or more devices and/or an amount of time that will be utilized to transfer the data. For example, a data exchange parameter may be an estimate data transmission time, an actual data transmission time, a bandwidth, a data size, a memory size, a buffer size, etc.

Example methods, apparatus, systems and articles of manufacture to for contention based spatial sharing in wireless communication systems are disclosed herein. Further examples and combinations thereof include the following:

Example 1 is a first wireless communications device comprising: a memory to store data for transmission, a priority controller to: determine data exchange parameters for transmission of the data, set a contention window based on the data exchange parameters, a media access control to: wait for a timer to expire, a duration of the timer selected based on the contention window, and transmit the data when the timer expires.

Example 2 includes the first wireless communication device as defined in example 1, wherein the data exchange parameters are at least one of a data transmission time, a data size, or a data buffer size.

Example 3 includes the first wireless communications device as defined in example 1 or example 2, wherein the priority controller is to calculate the contention window setting as a maximum contention window based on the data exchange parameters.

Example 4 includes the first wireless communications device as defined in example 1, wherein the priority controller is to set the contention window setting by setting a quality of service class.

Example 5 includes the first wireless communications device as defined in example 1, wherein the priority controller is further to determine a remaining transmission opportunity.

Example 6 includes the first wireless communications device as defined in example 5, wherein the priority controller is to set the contention window setting based on the remaining transmission opportunity.

Example 7 includes the first wireless communications device as defined in example 5, wherein the priority controller is to determine the remaining transmission opportunity based on a training message sent by a second wireless communication device.

Example 8 is a method for contention based spatial sharing in wireless communication, the method comprising: determining data exchange parameters for data stored in a memory of a first wireless communication device, setting a contention window based on the data exchange parameters, setting a duration of a timer based on the contention window, and in response to expiration of the timer, transmitting the data.

Example 9 includes the method as defined in example 8, wherein the data exchange parameters are at least one of a data transmission time, a data size, or a data buffer size.

Example 10 includes the method as defined in example 8 or example 9, further including calculating the contention window setting as a maximum contention window based on the data exchange parameters.

Example 11 includes the method as defined in example 8, further including setting the contention window setting by setting a quality of service class.

Example 12 includes the method as defined in example 8, further including determining a remaining transmission opportunity.

Example 13 includes the method as defined in example 12, further including setting the contention window setting based on the remaining transmission opportunity.

Example 14 includes the method as defined in example 12, further including determining the remaining transmission opportunity based on a training message sent by a second wireless communication device.

Example 15 is a tangible computer readable medium comprising instructions that, when executed, cause a first wireless communication device to at least: store data for transmission, determine data exchange parameters for transmission of the data, set a contention window based on the data exchange parameters, wait for a timer to expire, a duration of the timer selected based on the contention window, and transmit the data when the timer expires.

Example 16 includes the tangible computer readable medium as defined in example 15, wherein the data exchange parameters are at least one of a data transmission time, a data size, or a data buffer size.

Example 17 includes the tangible computer readable medium as defined in example 15 or example 16, wherein the instructions, when executed, cause the first wireless communication device to calculate the contention window setting as a maximum contention window based on the data exchange parameters.

Example 18 includes the tangible computer readable medium as defined in example 15, wherein the instructions, when executed, cause the first wireless communication device to set the contention window setting by setting a quality of service class.

Example 19 includes the tangible computer readable medium as defined in example 15, wherein the instructions, when executed, cause the first wireless communication device to determine a remaining transmission opportunity.

Example 20 includes the tangible computer readable medium as defined in example 19, wherein the instructions, when executed, cause the first wireless communication device to set the contention window setting based on the remaining transmission opportunity.

Example 21 includes the tangible computer readable medium as defined in example 19, wherein the instructions, when executed, cause the first wireless communication device to determine the remaining transmission opportunity based on a training message sent by a second wireless communication device.

Example 22 is a first wireless communication comprising: means for determining data exchange parameters for data stored in a memory of a first wireless communication device, means for setting a contention window based on the data exchange parameters, means for setting a duration of a timer based on the contention window, and means for in response to expiration of the timer, transmitting the data.

Example 23 includes the first wireless communication as defined in example 22, wherein the data exchange parameters are at least one of a data transmission time, a data size, or a data buffer size.

Example 24 includes the first wireless communication as defined in example 22 or example 23, further including means for calculating the contention window setting as a maximum contention window based on the data exchange parameters.

Example 25 includes the first wireless communication as defined in example 22, further including means for setting the contention window setting by setting a quality of service class.

Example 26 includes the first wireless communication as defined in example 22, further including means for determining a remaining transmission opportunity.

Example 27 includes the first wireless communication as defined in example 26, further including means for setting the contention window setting based on the remaining transmission opportunity.

Example 28 includes the first wireless communication as defined in example 26, further including means for determining the remaining transmission opportunity based on a training message sent by a second wireless communication device.

Example 29 is a wireless communication system comprising: a first wireless communication device to transmit training data identifying a transmission opportunity, and a second wireless communication comprising: a memory to store data for transmission, a priority controller to: determine the transmission opportunity from the training data transmitted by the first wireless communication device, determine data exchange parameters for transmission of the data, set a contention window based on the data exchange parameters, a media access control to: wait for a timer to expire, a duration of the timer selected based on the contention window, and transmit the data when the timer expires.

Example 30 includes the system as defined in example 29, wherein the data exchange parameters are at least one of a data transmission time, a data size, or a data buffer size.

Example 31 includes the system as defined in example 29 or example 30, wherein the priority controller is to calculate the contention window setting as a maximum contention window based on the data exchange parameters.

Example 32 includes the system as defined in example 29, wherein the priority controller is to set the contention window setting by setting a quality of service class.

Example 33 includes the system as defined in example 29, wherein the priority controller is further to determine a remaining transmission opportunity.

Example 34 includes the system as defined in example 33, wherein the priority controller is to set the contention window setting based on the remaining transmission opportunity.

Example 35 includes the system as defined in example 33, wherein the priority controller is to determine the remaining transmission opportunity based on a training message sent by a second wireless communication device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A wireless communication device comprising:
a memory to store first data for transmission;
a priority controller to:
  determine data exchange parameters for transmission of the first data; and
  set a first contention window based on the data exchange parameters; and a media access control to:
  wait for a timer to expire, a duration of the timer selected based on the first contention window;
  transmit the first data when the timer expires; and
  transmit training data identifying a transmission opportunity,
the priority controller to determine second data exchange parameters for second data, wherein the second data is smaller than the first data, set a second contention window longer than the first contention window based on the second data exchange parameters and the transmission opportunity, and set a second duration of a second timer based on the second contention window; and
the media access control to, in response to expiration of the second timer, transmit the second data.

2. A wireless communication device as defined in claim 1, wherein the data exchange parameters are at least one of a data transmission time, a data size, or a data buffer size.

3. A wireless communication device as defined in claim 1, wherein the priority controller is to calculate the contention window setting as a maximum contention window based on the data exchange parameters.

4. A wireless communication device as defined in claim 1, wherein the priority controller is to set the contention window setting by setting a quality of service class.

5. A wireless communication device as defined in claim 1, wherein the priority controller is further to determine a remaining transmission opportunity.

6. A wireless communication device as defined in claim 5, wherein the priority controller is to set the contention window setting based on the remaining transmission opportunity.

7. A wireless communication device as defined in claim 5, wherein the priority controller is to determine the remaining transmission opportunity based on a training message sent by a previously transmitting wireless communication device.

8. A method for contention based spatial sharing in wireless communication, the method comprising:
  determining data exchange parameters for first data stored in a memory of a wireless communication device;
  setting a first contention window based on the data exchange parameters;
  setting a duration of a timer based on the first contention window;
  in response to expiration of the timer, transmitting the first data;
  transmitting training data identifying a transmission opportunity;
  determining second data exchange parameters for second data stored in a second memory of a further wireless communication device, wherein the second data is smaller than the first data;
  setting a second contention window longer than the first contention window based on the second data exchange parameters and the transmission opportunity;
  setting a second duration of a second timer based on the second contention window; and
  in response to expiration of the second timer, transmitting the second data.

9. A method as defined in claim 8, wherein the data exchange parameters are at least one of a data transmission time, a data size, or a data buffer size.

10. A method as defined in claim 8, further including calculating the contention window setting as a maximum contention window based on the data exchange parameters.

11. A method as defined in claim 8, further including setting the contention window setting by setting a quality of service class.

12. A method as defined in claim 8, further including determining a remaining transmission opportunity.

13. A method as defined in claim 12, further including setting the contention window setting based on the remaining transmission opportunity.

14. A method as defined in claim 12, further including determining the remaining transmission opportunity based on a training message sent by a previously transmitting wireless communication device.

15. A method as defined in claim 8, wherein
  the determining the second data exchange parameters
  the setting the second contention window, and
  the setting the second duration is performed by the further wireless communication device.

16. A tangible computer readable medium comprising instructions that, when executed, cause a wireless communication device to at least:
  store first data for transmission;
  determine data exchange parameters for transmission of the first data;
  set a first contention window based on the data exchange parameters;
  wait for a timer to expire, a duration of the timer selected based on the first contention window;
  transmit the first data when the timer expires;
  transmit training data identifying a transmission opportunity
  determine second data exchange parameters for second data stored in a second memory of a further wireless communication device, wherein the second data is smaller than the first data;
  set a second contention window longer than the first contention window based on the second data exchange parameters and the transmission opportunity; and
  set a second duration of a second timer based on the second contention window; and
  in response to expiration of the second timer, transmitting the second data.

17. A tangible computer readable medium as defined in claim 16, wherein the data exchange parameters are at least one of a data transmission time, a data size, or a data buffer size.

18. A tangible computer readable medium as defined in claim 16, wherein the instructions, when executed, cause the wireless communication device to calculate the contention window setting as a maximum contention window based on the data exchange parameters.

19. A tangible computer readable medium as defined in claim 16, wherein the instructions, when executed, cause the wireless communication device to set the contention window setting by setting a quality of service class.

20. A tangible computer readable medium as defined in claim 16, wherein the instructions, when executed, cause the wireless communication device to determine a remaining transmission opportunity.

21. A tangible computer readable medium as defined in claim 20, wherein the instructions, when executed, cause the wireless communication device to set the contention window setting based on the remaining transmission opportunity.

22. A tangible computer readable medium as defined in claim 20, wherein the instructions, when executed, cause the wireless communication device to determine the remaining transmission opportunity based on a training message sent by a previously transmitting wireless communication device.

23. A tangible computer readable medium as defined in claim 16, wherein the instructions, when executed, cause the further wireless communication device to perform the
 determining the second data exchange parameters,
 the setting the second contention window,
 the setting the second duration; and,
in response to expiration of the second timer, the transmitting the second data.

* * * * *